(12) United States Patent
Mick, Jr.

(10) Patent No.: US 9,510,062 B1
(45) Date of Patent: Nov. 29, 2016

(54) IN-BAND TRICK MODE CONTROL

(71) Applicant: THIS TECHNOLOGY, INC., Denver, CO (US)

(72) Inventor: John Raymond Mick, Jr., Sunnyvale, CA (US)

(73) Assignee: This Technology, Inc., Philadelphia, PA (US)

( * ) Notice: Subject to any disclaimer, the term of this patent is extended or adjusted under 35 U.S.C. 154(b) by 0 days.

(21) Appl. No.: 14/825,691

(22) Filed: Aug. 13, 2015

(51) Int. Cl.
| | |
|---|---|
| H04H 20/14 | (2008.01) |
| H04H 60/29 | (2008.01) |
| H04N 21/6587 | (2011.01) |
| H04N 21/2747 | (2011.01) |
| H04N 21/235 | (2011.01) |
| H04N 21/8547 | (2011.01) |
| H04N 21/81 | (2011.01) |
| H04N 21/858 | (2011.01) |

(52) U.S. Cl.
CPC ...... *H04N 21/6587* (2013.01); *H04N 21/2353* (2013.01); *H04N 21/2747* (2013.01); *H04N 21/812* (2013.01); *H04N 21/8547* (2013.01); *H04N 21/8586* (2013.01)

(58) Field of Classification Search
CPC .............. H04N 21/2353; H04N 21/26258; H04N 21/4622; H04N 21/812
USPC ........................................................ 725/22
See application file for complete search history.

(56) References Cited

U.S. PATENT DOCUMENTS

| | | | |
|---|---|---|---|
| 9,189,806 B2* | 11/2015 | Manzari | G06Q 30/0277 |
| 2002/0191950 A1* | 12/2002 | Wang | H04N 5/783 386/218 |
| 2014/0143806 A1* | 5/2014 | Steinberg | H04N 21/23424 725/34 |

* cited by examiner

*Primary Examiner* — Dominic D Saltarelli
(74) *Attorney, Agent, or Firm* — Baker & Hostetler, LLP (57) ABSTRACT

A server may receive metadata associated with specific content in a transport signal stream from a content information service. The metadata may identify a point in time of the transport signal stream. The server may instruct an encoder to insert a marker into the transport signal stream corresponding to the point in time of the transport signal stream. The marker may indicate control of a trick mode to be enforced by a delivery platform subsequent to the point in time of the transport signal stream. The server may record the marker in a data store associated with the server.

30 Claims, 6 Drawing Sheets

IN-BAND TRICK MODE CONTROL

TECHNICAL FIELD

The present invention relates generally to service provider video networks, and more particularly, to a method and system for permitting streaming television service providers to enable or disable trick modes in multiple delivery platforms.

BACKGROUND

In the television industry, the term "trick modes" refers to a set of delivery platform capabilities that mimics the capabilities of older, more traditional appliances for watching videos, such as video cassette recorders (i.e., VCRs). The most common trick modes found in delivery platforms include pausing a video during playback, stopping a video that is playing, "fast-forwarding" a video to a later point in time, and "rewinding" a video to an earlier point in time. There may be other types of "trick mode" capabilities in a player, such as "skipping ahead" to a later point in time in a video.

There are times when a content programmer or a content provider may wish to block a viewer from using one or more trick modes on his or her delivery platform. For example, in the past, a viewer may employ a VCR to record an episode of the show "30 Rock" to tape and then to watch it later. When the viewer views the taped episode, the viewer may fast-forward through all of the commercials to view the episode in the shortest time possible without watching the commercial content that the individual did not consider entertaining. This was acceptable under the traditional streaming model (though not entirely, as content providers originally attempted to outlaw VCRs) mainly because no one could really do anything to determine when it was happening, nor could anyone do anything to stop it from happening.

However, the ongoing shift in behavior from users consuming content via live streaming on television to consuming time-shifted or on-demand content has given rise to delivery platform technology that can: (a) provide more transparency into how watchers are consuming video content, and (b) give providers the ability to exert some control over how they permit their content to be consumed.

In a nutshell, providers want to be able to stop viewers from fast-forwarding or skipping through advertisements while still permitting them to use these and other trick mode controls during the entertainment content. This requires the ability to disable some or all trick modes during some segments of content and to enable some or all trick modes during other segments of content.

SUMMARY

The above-described problems are addressed and a technical solution is achieved in the art by providing a method and system for embedding and/or associating trick mode-related instructions directly in or indirectly with ad creative content streams. A server may be configured to receive metadata associated with specific content in a transport signal stream from the content information service. The server may instruct the encoder to insert a marker into a transport signal stream provided by a content information service (CIS) based on the received metadata (e.g., the type of trick mode, the trick mode state (e.g., enabled or disabled), the trick mode duration, the transport signal stream frame rate and resolution, etc.). The marker may indicate control of a trick mode to be enforced by a delivery platform subsequent to a specified point in time of the transport signal stream (e.g., ad creative content, entertainment content, or both ad creative content and entertainment content, both provided by a placement opportunity information service (POIS)).

The specific content may be ad creative content, entertainment content, or both ad creative content and entertainment content.

In one example, the indication may comprise the marker. The marker may comprise an ID3 tag. The ID3 tag may comprise a unique identifier indicative of the identified point in time of the content and the one or more trick mode settings. The unique identifier may be a universal unique identifier (UUID). In an example, the server may insert the ID3 tag into a data track or a fundamental track of the transport signal stream.

In an example, the server may instruct the delivery platform to enforce the one or more trick mode settings associated with the marker at the point in time of the transport signal stream. In another example, the marker may comprise instructions to enforce one or more trick mode settings in the delivery platform at the point in time of the transport signal stream.

In an example, the server may receive from an advertisement decision service (ADS) or a placement opportunity information service (POIS) trick mode restriction metadata regarding one or more trick mode settings corresponding to the trick mode to be enforced by a delivery platform subsequent to the point in time of the transport signal stream for the specific content. The one or more trick mode settings may comprise information regarding at least one of enabling or disabling the trick mode, the type of trick mode, time point offsets, content duration, or the duration of time that the trick mode is to be enabled or disabled. In an example, the trick mode restriction metadata may comprise a universally unique identifier (UUID) associated with the marker, and one or more uniform resource locators associated with the marker.

In an example, the server may associate the trick mode restriction metadata information with the marker. The server may be configured store the associated trick mode restriction metadata information in the data store.

In an example, the marker may be operable to instruct the delivery platform to send a request to the server for one or more instructions to enforce one or more trick mode settings associated with the marker.

In an example, the server may receive from the delivery platform a request for one or more instructions to enforce one or more trick mode settings associated with the marker. The server may provide to the delivery platform the one or more instructions to enforce the one or more trick mode settings associated with the marker.

In an example, the server may receive from the delivery platform an indication that the delivery platform has encountered the marker at the point in time of the transport signal stream. The server may retrieve from the data store the one or more trick mode settings associated with the marker. The server may transmit to the delivery the one or more trick mode settings associated with the marker.

In an example, the indication may comprise a universal resource locator (URL). In an example, the URL may comprise at least one of a unique identifier indicative of the identified point in time of the content, one or more trick mode control settings, or an endpoint location for the delivery platform to make a network request in order to receive trick mode instructions.

The server may receive from the delivery platform an indication that the delivery platform is enforcing the one or more trick mode settings associated with the marker.

The server may receive from the delivery platform an indication that a consumer used an enabled trick mode or tried to use a disabled trick mode subsequent to the point in time of the transport signal stream.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION

Figure 1:
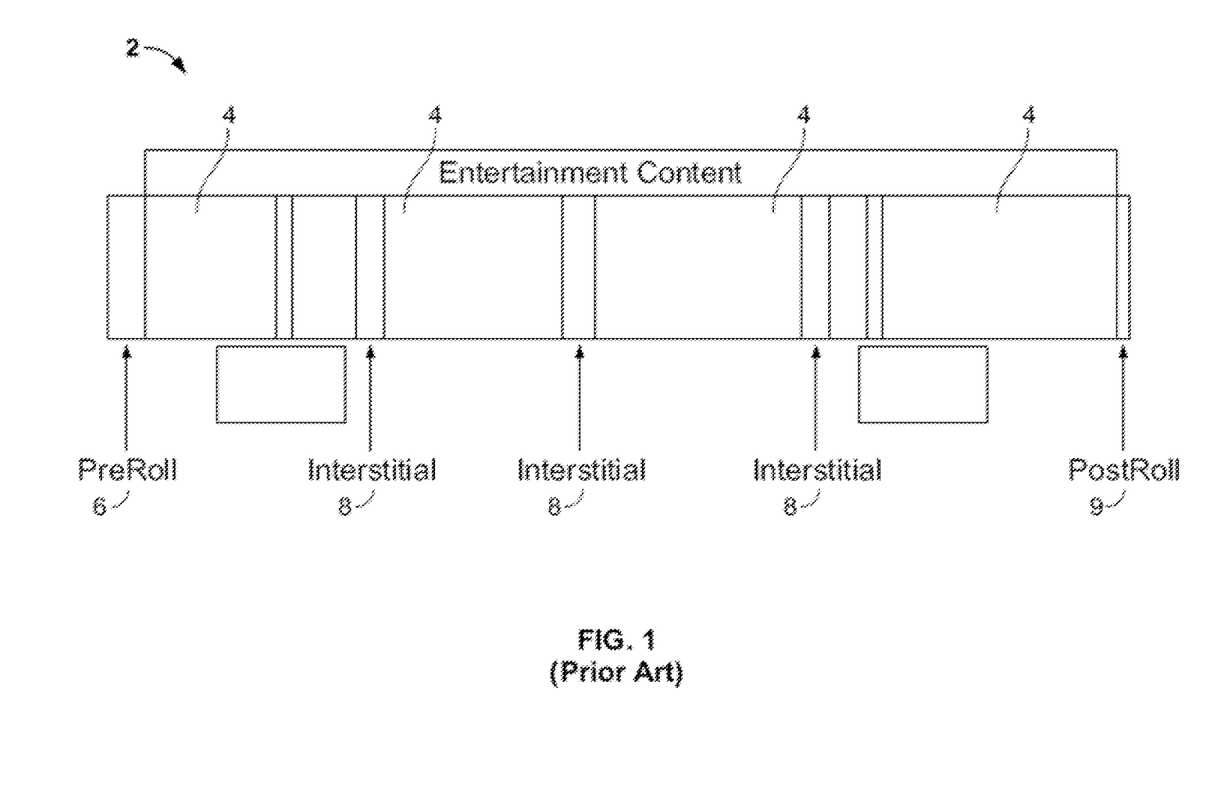
FIG. 1 illustrates a conventional linear or video-on-demand model for advertisement placement.

Traditionally, programming of broadcast and cable television and radio, including content (i.e., the video or audio program) and (the placement of) ads in a video or audio signal stream, has followed a linear model. Programming may be linear in the sense that a program begins and is streamed and in progress when a user chooses to view entertainment content. FIG. 1 illustrates a linear or video-on-demand (VOD) model for advertisement placement. Entertainment content 2, when processed as a digital data stream over a cable network, may be divided into a number of time intervals. The time intervals 4 include time reserved for a viewed program (content), such as "Golden Girls." The intervals 6, 8, 9 represent sections of time reserved for advertisements or "avails." These "avails" may be viewed as advertisement placement opportunities. As used herein, a "placement opportunity" was traditional called an avail and is sometimes referred to as a slot (spots into slots). A placement opportunity (PO) is a construct that represents an opportunity to insert an advertisement or entertainment content, and defines the rules for that opportunity, such as its duration, interactivity, ownership, and technical constraints.

As used herein, an estimated starting location of a break in a signal stream is referred to as a signal point. In the context of advertisement placement, these signal points may be referred to as advertisement signal points.

In non-linear systems, such as Video-on-Demand (VOD), the intervals 6, 8, 9 may take on new meanings. The interval 6 is called a pre-roll, i.e., the space in a video that occurs immediately after a user clicks to start a VOD video. The interval 9 is known as a post-roll, i.e., the space after all of the VOD video segments have finished playing. The intervals 8 may be mid-rolls, i.e., mini-breaks in the middle of a VOD video, or may be interstitials, i.e., pod-like locations between consecutive VOD video segments. VOD advertisement placement opportunities may appear based on space, time, content, and user context and may be highly non-linear (i.e., the user chooses to initiate the playing of content and in response, the content starts). All of the intervals 6, 8, 9 in such play lists are ripe for the insertion of advertisements, i.e., advertisement placement opportunities.

Examples of the present disclosure are compatible with and make use of elements defined according to the SCTE-130 standard. The SCTE-130 standard provides a standardized and extensible message based interface defining a minimal set of cooperating logical services necessary to communicate placement opportunities, placement decisions, and placement related event data necessary for accountability measurements. SCTE-130 defines an extensible framework of interfaces among a set of advertising system logical services. The SCTE-130 standard encompasses: a minimal set of cooperative logical services needed to implement advanced addressable advertising systems; the core data types and extensible message framework forming a vocabulary needed to communicate among the defined logical services; the interfaces among these logical services using the core data types and messages; and, mechanisms for extensibility that allow innovation while preserving backward compatibility with already deployed systems—thereby reducing the complexity for incorporating new features within the standard.

The normative parts of the SCTE-130 standard define mechanisms for integrating systems implementing features such as VOD-based advertising, linear-based advertising, enhanced advertising capabilities such as advertisement rotation groups (rotation groups refer to placement opportunities that run in rotation so that the same advertisement is not viewed again immediately), subscriber-based addressing for advertising or content tailoring, extension points for more advanced advertising or addressing features, logical services that are implemented as one or more physical systems created by the same vendor, deployment of a logical service that may simultaneously include systems from one or more vendors, and an implementation that may incorporate one or more of the defined logical services and interfaces The SCTE-130 standard defines a set of logical services comprising an advanced advertising system. Each logical service may itself be a complex system. In an embodiment, one or more of the following logical services may be used by or interact with certain embodiments of the present invention.

An Advertisement Management Service (ADM) defines messages in support of advertisement insertion activities. The primary consumer of these messages is an Advertisement Decision Service (ADS). The message interfaces exposed by an ADM permit both pre-configured advertisement decisions as well as real-time fulfillment models. An ADM implementation may incorporate some simple advertisement selection rules (e.g., advertisement rotations) but more complex advertisement decisions are the responsibility of an ADS.

An Advertisement Decision Service (ADS) determines how advertising content is combined with non-advertising (i.e., entertainment) content assets. The decisions made by an ADS may be straightforward (i.e., specific advertisement content placed at a specific time in a specific asset) or arbitrarily complex (based on subscriber data, advertising zone, etc.).

A Content Information Service (CIS) manages metadata describing assets (both advertising assets and non-advertising assets) available to the other SCTE-130 logical services. The CIS provides query and notification interfaces to the other logical services. The query service is available on an ad-hoc basis and may be called by any other logical service at any time without any prior registration. Queries specify values or patterns to be sought in the query message metadata and the specified matching information (or an error indication) is returned in a response message.

The Content Information Service (CIS) is a storage and distribution engine. It stores metadata about entertainment and advertising assets; provides notifications to registered clients when metadata is modified; registers, receives and processes notifications from other CIS services; and supports real-time metadata queries. The CIS permits an Advertising Manager (ADM) and/or Advertisement Decision Service (ADS) to retrieve and utilize content metadata in their advanced advertising decision processing.

A Placement Opportunity Information Service (POIS) may hold, maintain, and retain descriptions of placement opportunities. The POIS may also contain attributes and constraints for each placement opportunity, platform compliance, rights, and policies of the content in which the placement opportunity exists. These placement opportunities are content specific, therefore attributes and constraints may vary by network, geographic region, or other content distribution dimension.

The POIS is a Placement Opportunity (PO) storage and inventory execution engine. It stores PO metadata and statistics; provides notifications to registered clients when PO metadata is modified; registers, receives and processes notifications from other POIS services; and supports real-time PO metadata queries. Through the POIS appliance, an Advertising Manager (ADM) and/or Advertisement Decision Service (ADS) can retrieve and utilize placement opportunity metadata in their advanced advertising decision making.

The Subscriber Information Service (SIS) manages per-subscriber information relevant to advertisement placement decisions. The SIS provides a mapping between subscriber or client identifiers, such as a MAC address, serial number, etc., and subscriber or audience attributes, e.g., age, sex, location of a subscriber.

The term "computer" or "computer platform" is intended to include any data processing device, such as a desktop computer, a laptop computer, a tablet computer, a mainframe computer, a server, a handheld device, a digital signal processor (DSP), an embedded processor (an example of which is described in connection with FIG. 5), or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

Figure 2:
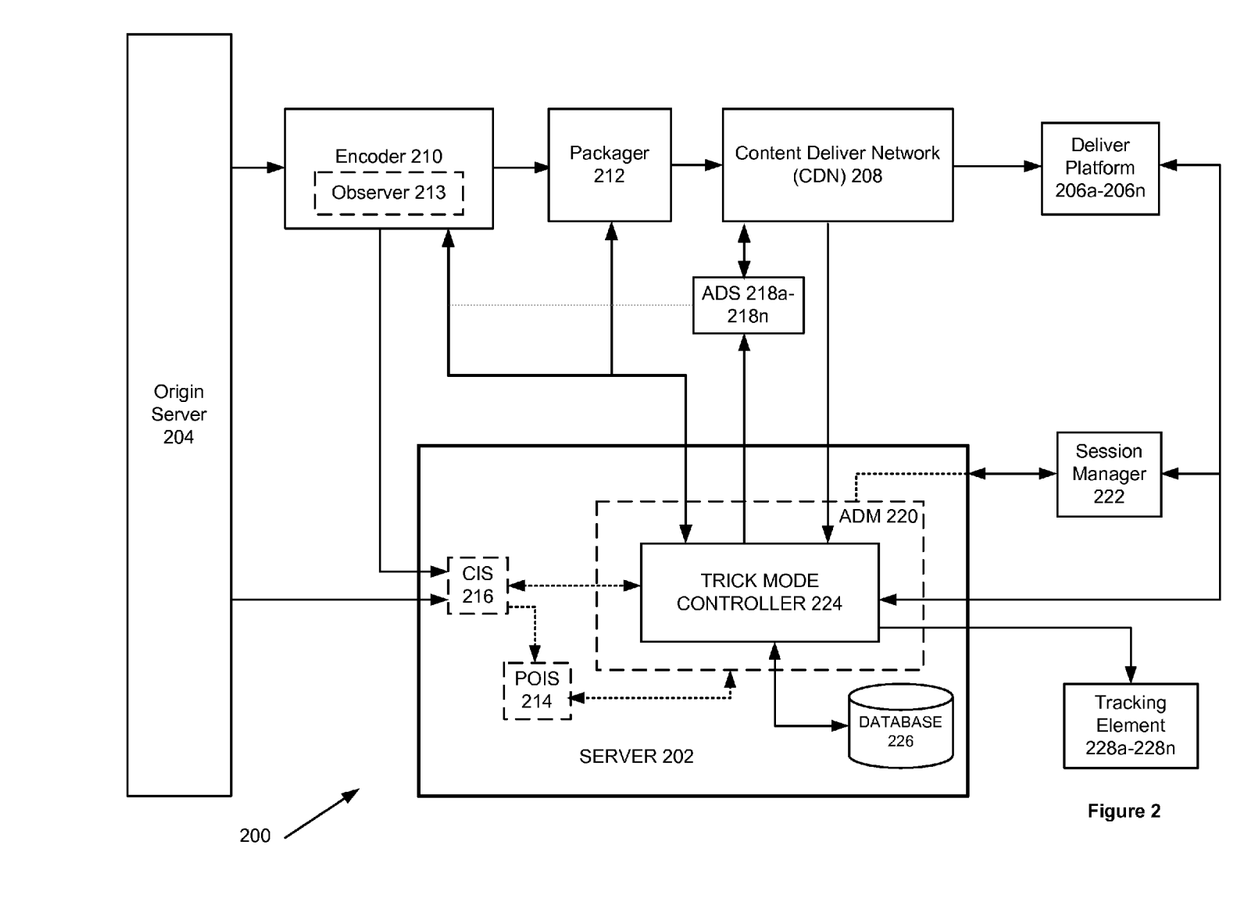
FIG. 2 depicts a configuration of a system for permitting streaming television service providers to enable or disable trick modes in delivery platforms.

FIG. 2 depicts a configuration of a system 200 for permitting streaming television service providers to enable or disable trick modes in delivery platforms. The system 200 may be executed on a server 202, interconnected by one or more networks (not shown) and communicatively connected to an origin server 204 which is configured to provide content (entertainment content and advertisement breaks) to one or more delivery platforms 206a-206n. On TV, the advertising network was formerly the national network, the cable network, or the cable operator. However, unlike the Internet, where browsers access/display content and then are separately "referred" to a shared advertisement network, the Internet-based cable television infrastructure selects and assembles both the advertisement and the content together and delivers the combined result to customers' delivery platforms 206a-206n (e.g., Internet ready televisions, radios, smartphones, tablets, PCs, etc.).

Recently, delivery platforms 206a-206n, such as Internet-ready televisions, have become capable of receiving content from Internet streaming services, such as Netflix movies, Pandora streaming radio, etc., over WiFi or direct Ethernet connections. When a user clicks on an icon for an "app" that appears on the television set corresponding to one of these services, the content is streamed to the delivery platform (e.g., 206a) from a content delivery network (CDN) 208 directly to the application running in the delivery platform (e.g., 206a) without the need for a set top box.

A set top box may be configured to decode an analog representation of two states of a digital signal, as is known in the art, that is continuously streamed and pushed to the set top box through a broadcast facility over a coaxial or fiber optic cable and the set top box tunes to that channel and displays the content. When a user watches Internet-delivered program content, a browser within the delivery platform (e.g., 206a) fetching video in predetermined time chunks—generally two, sometimes three, sometimes ten second chunks. The fetched chunks of video are seamlessly stitched together dynamically in the application software of the delivery platform (e.g., 206a) and then displayed so as to appear as a smooth video on the delivery platform (e.g., 206a).

A Multiple System/Service Operator (MSO—a cable TV organization that owns more than one cable system and may prove broadband Internet service) may wish to rebroadcast video streams on delivery platforms. Unfortunately, every connected device, including delivery platforms, needs to obtain video in the format that it can consume. Apple, Microsoft, Adobe, etc., have very specific and incompatible formats. To overcome this problem, each of these companies has constructed facilities called content delivery networks (CDN) 208 where a "set top box" for each channel is configured to receive broadcasts from satellites.

A signal stream received by a "set top box" from the origin server 204 is fed to an encoder 210 to transform the signal stream to a transport signal stream of one or more bit rates and/or formats and a packager 212 to fragment the transport signal stream into the predetermined (e.g., 2 second) segments of data. The encoder 210 may convert the signal stream to one or more of a plurality of formats (e.g., H264, MPEG2, MPEG4, etc.) and resolutions (e.g., standard definition at 640p, or high definition at, for example 720p, 1080i, 1080p, etc.). A distinct transport signal stream may be provided to the packager 212 in each of the plurality of formats and resolutions. The packager 212 may divide the transport signal streams into segments representing intervals of time or "chunks" of video, audio, etc. (e.g., between 2 and about 10 second intervals) according to a standard format associated with a specific vendor (e.g., Microsoft, Apple, Adobe, etc.). These segments are then stored at the CDN 208 on server farms located physically close to where the content is to be delivered.

To identify a particular channel data stream or "session", including times when a program has ended and before the next program begins, i.e., a placement opportunity, a cue-tone is inserted in the channel data stream a predetermined time before the next program begins. The cue-tone may be an instance of an SCTE-35 packet.

An observer 213, which may be the encoder 210, informs placement opportunity information service (POIS) 214 of the arrival of the cue tone for subsequent placement of one or more advertisements into the channel data stream by an advertisement service (ADS) (e.g., 218a). If the ADS (e.g., 218a) is known to the POIS 214, then the POIS 214 notifies the ADS (e.g., 218a) of the cue tone notification. The advertisement placement service (e.g., 218a), in turn, is waiting for the subsequent arrival of requests from a CDN 208 to place advertisements into breaks (i.e. one or more of the segments) in the channel data stream (session).

The ADSs 218a-218n may be configured to place advertisements into advertisement breaks in subscriber data streams at the request of a content delivery network (CDN) 208 for delivery to one or more delivery platforms 206a-206n.

The server 202 may be associated with or implement a CIS 216 for receiving one or more source signal streams (channels) originating from the origin server 204 and corresponding cue-tones (i.e., instances of SCTE-35 packets) from the observer 220, which may be incorporated within an encoder 210. The CIS 216 may also be configured to identify metadata from the one or more source signal streams received from the encoder 210 and to deliver the identified metadata to the server 202. The received metadata may identify each of a plurality of formats (e.g., H264, MPEG2, MPEG4, etc.) and resolutions (e.g., standard definition at 640p, or high definition at, for example 720p, 1080i, 1080p, etc., that includes a frame rate of the transport signal stream) for each of the one or more transport signal streams output by the encoder 210 and corresponding to a respective source signal stream (channel). As described above, the encoder 210 may be configured to feed each of the transport signal streams to the packager 212. The packager 212 may be configured to further format the one or more transport signal streams and divide the streams into segments representing intervals of time or "chunks" of IP video, audio, etc., (e.g., between 2 and about 10 second intervals) according to a standard format associated with a specific vendor (e.g., Microsoft, Apple, Adobe, etc.). The packager 212 may be configured to deliver IP video, audio, etc., in predetermined "chunks" to the CDN 208 as described above. The server 202 may be configured to extract metadata from the packager 212 that a length in terms of time of a segment or chunk size.

The server 202 may be configured to pre-allocate a corresponding number of unconfirmed placement opportunities (POs) without signals and to bind the source signal stream to a plurality of premade, but unconfirmed placement opportunities. Part of the identified metadata includes a channel identifier associated with a corresponding source signal stream. The CIS 216 may be configured to return a globally unique value, a UUID, referred to as a signal identifier or signal ID that uniquely identifies a placement opportunity as a confirmed placement and its starting location within the end-to-end operational system 200. The CIS 216 may be further configured to insert the signal ID and the channel identifier into the metadata of the source signal stream using the appropriate in-band carriage format.

In one example, a POIS 214 may be implemented by the server 202. The POIS 214 may be configured to "confirm" unconfirmed placement opportunities by identifying temporal starting and ending locations (and thus a beginning and end point in terms of time) of the unconfirmed placement opportunities (e.g., including advertisement signal point(s)) relative to both the content stream and a wall clock.

In one embodiment, the POIS 214 may be configured to initiate a workflow in an instance of an SCTE 130 Advertisement Management Service 220, or ADM 220, associated with the server 202 to identify a list representative of a number of transport streams (e.g., a number of sessions) having the channel identifier. To identify the list, the ADM 220 places a call each to an external session manager 222. The ADM 220 transmits the channel identifier to the session manager 222, which provides the ADM 220 with a list of client identities indicative of a number of recipients currently viewing a channel corresponding to the channel identifier. The ADM 220 may be configured to obtain a plurality of advertisements corresponding to the list correlated to the channel identifier from one or more of the ADS s 218a-218n. The ADM 220 receives from the ADSs 218a-218n the plurality of advertisements targeted to the list representative of the plurality of transport streams (sessions).

The ADM 220 uses the unique signal ID plus a set of locally configured or learned targeting criteria to initiate a unique set of advertisement decision requests. The advertisement decision requests evolve into targeted advertisement decision requests to the appropriate decision owners (i.e., the ADSs 218a-218n) and the results are a set of advertisement placement decisions correlating to the placement opportunities generated as a result of signal confirmation.

A trick mode controller 224 of the server 202 may be configured to receive metadata associated with specific content in a transport signal stream from the content information service (CIS) 216. The trick mode controller 224 may be further configured to instruct the encoder 210 to insert a marker into a transport signal stream provided by the CIS 216 based on received metadata (e.g., the type of trick mode, the trick mode state (e.g., enabled or disabled), the trick mode duration, the transport signal stream frame rate and resolution, etc.). The marker may indicate control of a trick mode to be enforced by a delivery platform (e.g., 206a) subsequent to a specified point in time of the transport signal stream (e.g., ad creative content, entertainment content, or both ad creative content and entertainment content, both provided by the POIS 214).

The specific content may be ad creative content, entertainment content, or both ad creative content and entertainment content.

The marker may comprise an ID3 tag. The ID3 tag may comprise a unique identifier indicative of the identified point in time of the content and the one or more trick mode settings. The unique identifier may be is a universal unique identifier (UUID). In an example, trick mode controller 224 may be configured to insert the ID3 tag into a data track or a fundamental track of the transport signal stream.

In an example, the trick mode controller 224 may be configured to instruct the delivery platform (e.g., 206a) to enforce the one or more trick mode settings associated with the marker at the point in time of the transport signal stream. In another example, the marker may comprise instructions to enforce one or more trick mode settings in the delivery platform (e.g., 206a) at the point in time of the transport signal stream.

In an example, the trick mode controller 224 may be configured to receive from the ADS (e.g., 218a) or the placement opportunity information service 214, trick mode restriction metadata regarding one or more trick mode settings corresponding to the trick mode to be enforced by a delivery platform (e.g., 206a) subsequent to the point in time of the transport signal stream for the specific content. The one or more trick mode settings may comprise information regarding at least one of enabling or disabling the trick mode, the type of trick mode, time point offsets, content duration, or the duration of time that the trick mode is to be enabled or disabled. In an example, the trick mode restriction metadata may comprise a universally unique identifier (UUID) associated with the marker, and one or more uniform resource locators associated with the marker.

In an example, the trick mode controller 224 may be configured to associate the trick mode restriction metadata information with the marker. The trick mode controller 224 may be configured to store the associated trick mode restriction metadata information in the data store (e.g., the database 226).

In an example, the marker may be operable to instruct the delivery platform to send a request to the trick mode controller 224 for one or more instructions to enforce one or more trick mode settings associated with the marker. In an example, the trick mode controller 224 may receive from the delivery platform (e.g., 206a) a request for one or more instructions to enforce one or more trick mode settings associated with the marker. The trick mode controller 224 may be configured to provide to the delivery platform (e.g., 206a) the one or more instructions to enforce the one or more trick mode settings associated with the marker. In an example, the trick mode controller 224 may be configured to receive from the delivery platform (e.g., 206a) an indication that the delivery platform (e.g., 206a) has encountered the marker at the point in time of the transport signal stream. In one example, the indication may comprise the marker. The trick mode controller 224 may be configured to retrieve from the data store (e.g., the database 226), the one or more trick mode settings associated with the marker. The trick mode controller 224 may be configured to transmit to the delivery platform (e.g., 206a), the one or more trick mode settings associated with the marker.

In an example, the indication may comprise a universal resource locator (URL). In an example, the URL may comprise at least one of a unique identifier indicative of the identified point in time of the content, one or more trick mode control settings, or an endpoint location for the delivery platform to make a network request in order to receive trick mode instructions.

The trick mode controller 224 may receive from the delivery platform (e.g., 206a) an indication that the delivery platform (e.g., 206a) is enforcing the one or more trick mode settings associated with the marker.

The trick mode controller 224 may receive from the delivery platform (e.g., 206a) an indication an indication that a consumer used an enabled trick mode or tried to use a disabled trick mode subsequent to the point in time of the transport signal stream.

Figure 3:
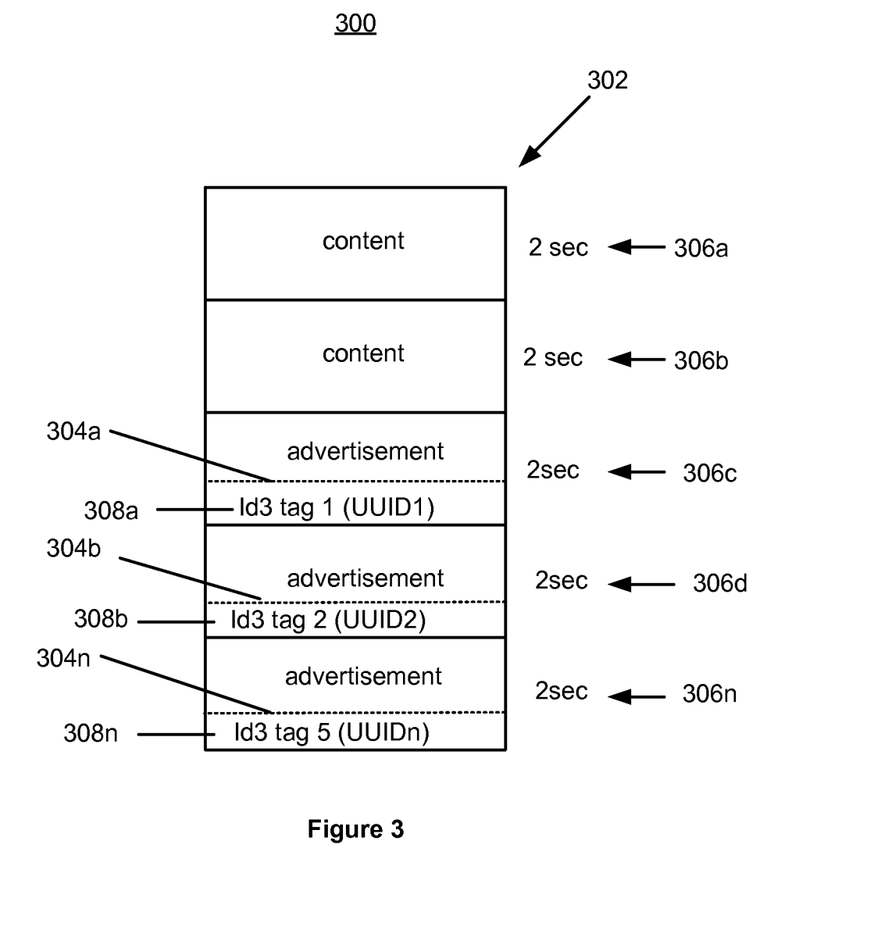
FIG. 3 is a block diagram illustrating the use of an ID3 tag as metadata to be incorporated into corresponding data tracks of a transport signal stream for providing markers for enabling or disabling trick mode settings in portions of an advertisement corresponding to each of the segments in a session.

FIG. 3 is a block diagram 300 illustrating the use of an ID3 tag as metadata to be incorporated into corresponding data tracks 304a-304n of a transport signal stream 302 for providing markers for indicating trick mode control settings to be enforced by the delivery platform (e.g., 206a) corresponding to each of the segments 306a-306n (e.g., 2 second "chunks") in a session. The transport signal stream 302 may comprise segments (e.g., 306a, 306b) corresponding to content and segments (e.g., 306c-306n) corresponding to an advertisement in the session. Each of the ID3 tags 308a-308n may comprise a unique identifier (e.g., UUID1, UUID2, UUIDn). In one example, the information provided in the ID3 tag (e.g. 308a) may be configured to indicate to the delivery platform (e.g., 206a) what trick mode to enforce and how to enforce the trick mode (e.g. enable or disable). In another example, the information provided in the ID3 tag (e.g. 308a) may be configured to indicate to the delivery platform (e.g., 206a) to call out to the trick mode controller 224 for obtaining instructions for what trick mode to enforce and how to enforce the trick mode (e.g., enable or disable).

For example, ID3 tag 308a may be operable to cause the delivery platform to disable the fast forwarding trick mode control. ID3 tag 308b may indicate to the delivery platform (e.g., 206a) to continue to disable fast forwarding but enable rewinding. ID3 tag 308a may indicate to the delivery platform (e.g., 206a) to enable all trick mode control types. It should It should be noted that the insertion of ID3 tags indicating enabling or disabling of one or more trick mode controls is not limited to sections of advertisement content, but may apply to portions of entertainment content or both advertisement content and entertainment content. It should also be noted that ID3 tags indicating a specific enabling or disabling of one or more trick mode settings may be, but is not limited to, insertion into at least one, but is not limited to one or more of the segments 306a-306n.

In an example, the trick mode controller 224 may be further configured to report the one or more trick mode control settings enforced by the delivery platform (e.g., 206a) to at least one tracking element (e.g., 230a). In an example, the information provided in the indication to be transmitted from the delivery platform (e.g., 206a) to the trick mode controller 224 may take the form of a string, e.g., "#URL://router/UUID/device identifier or MAC address/time code" where "router" is an IPV4 or IPV6 address of the router 202, UUID may be the UUID of the ID3 tag inserted by the trick mode controller 224 and received by the delivery platform (e.g., 206a), "device identifier or MAC identifier" is an identity associated with a particular delivery platform (e.g., 206a), such as a serial number of the delivery platform (e.g., 206a) or the MAC address (i.e., the media access control address) of the delivery platform (e.g., 206a) that effectively identifies a session of a channel played by the delivery platform (e.g., 206a), and "time code" refers to a wall clock time or time stamp that may be, for example, synchronized broadcast time (e.g., wall clock time delayed by seven seconds).

A tracking element (e.g., 228a) may be associated with a local or national programmer or network (e.g., 228a, 228b), an MSO (e.g., 228c), a local or national advertiser (e.g., 228d, 228e), a third party verification system (228n), or one or more of the ADSs (e.g., 218a-218n). The database 226 may comprise tables that include UUIDs, one or more corresponding trick mode controls, the device address or MAC address, and the time code. The trick mode controller 224 may be configured to retrieve from the data store (e.g., the database 226) the incoming data received by the trick mode controller 224 from the delivery platform (e.g., 206*a*) to a corresponding ID3 tag inserted into the transport signal stream. The mapped information for reporting to a tracking element (e.g., 228*a*) may be the name of a tracking element associated with the received session, the session, the one or more trick mode settings enforced by the delivery platform (e.g., 206*a*), the adaptive bit rate or resolution of the transport signal stream, and an associated time code.

Figure 4:
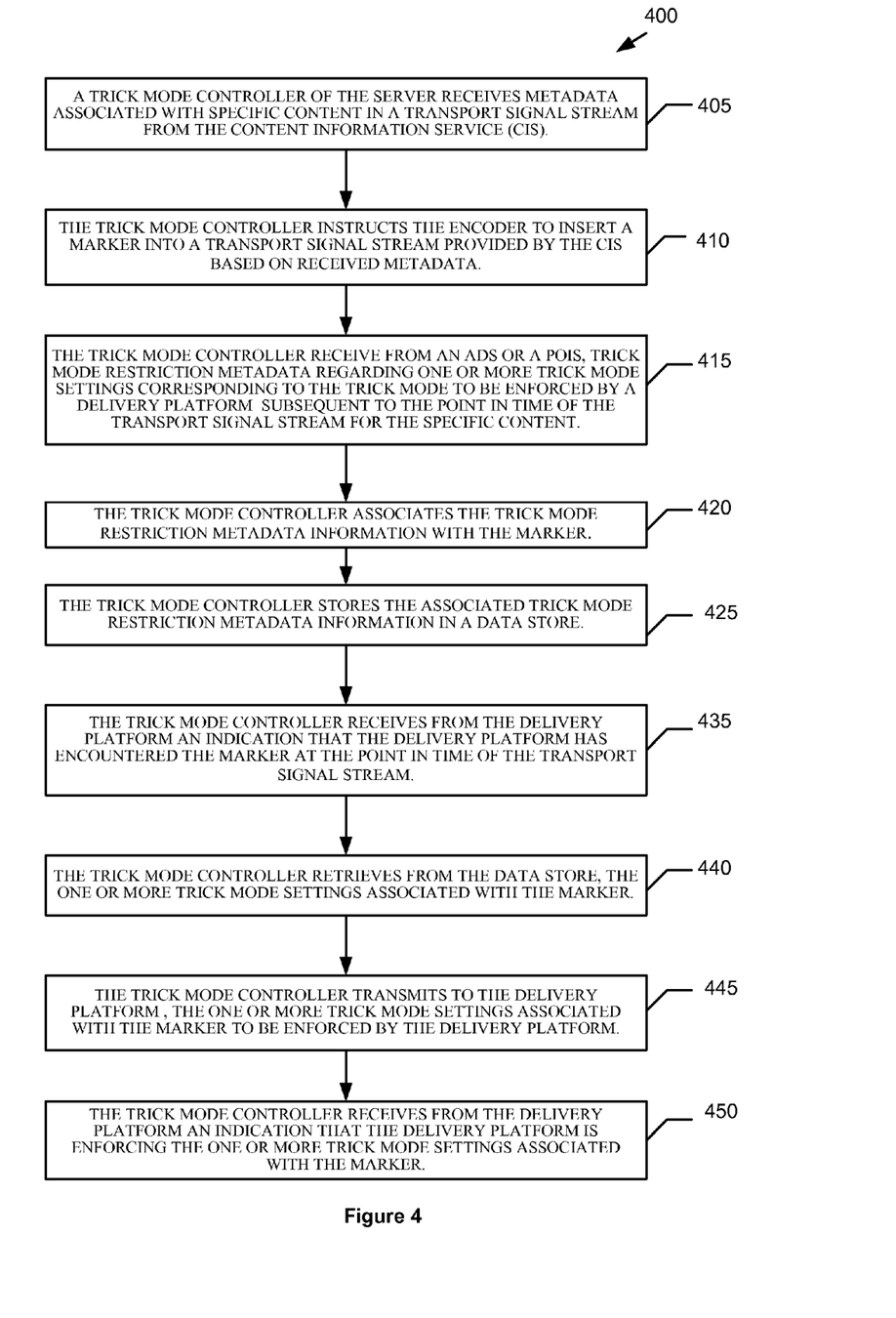
FIG. 4 is a block diagram illustrating one example of a method for permitting streaming television service providers to enable or disable trick modes in delivery platforms.

FIG. 4 is a flow diagram illustrating an example of a method 400 for permitting streaming television service providers to enable or disable trick modes in delivery platforms (e.g., (e.g., 206*a*-206*n*). The method 400 may be performed by a computer system 400 of FIG. 2 and may comprise hardware (e.g., circuitry, dedicated logic, programmable logic, microcode, etc.), software (e.g., instructions run on a processing device), or a combination thereof. In one example, the method 400 may be performed by the trick mode controller 224 of the server 202 of FIG. 2.

As shown in FIG. 4, at block 405, the trick mode controller 224 of the server 202 may receive metadata associated with specific content in a transport signal stream from the content information service (CIS) 216. At block 410, the trick mode controller 224 may instruct the encoder 210 to insert a marker into a transport signal stream provided by the CIS 216 based on received metadata (e.g., the type of trick mode, the trick mode state (e.g., enabled or disabled), the trick mode duration, the transport signal stream frame rate and resolution, etc.). The marker may indicate control of a trick mode to be enforced by a delivery platform (e.g., 206*a*) subsequent to a specified point in time of the transport signal stream (e.g., ad creative content, entertainment content, or both ad creative content and entertainment content, both provided by the POIS 214).

The specific content may be ad creative content, entertainment content, or both ad creative content and entertainment content.

The marker may comprise an ID3 tag. The ID3 tag may comprise a unique identifier indicative of the identified point in time of the content and the one or more trick mode settings. The unique identifier may be is a universal unique identifier (UUID). In an example, trick mode controller 224 may insert the ID3 tag into a data track or a fundamental track of the transport signal stream.

In an example, the trick mode controller 224 may instruct the delivery platform (e.g., 206*a*) to enforce the one or more trick mode settings associated with the marker at the point in time of the transport signal stream. In another example, the marker may comprise instructions to enforce one or more trick mode settings in the delivery platform (e.g., 206*a*) at the point in time of the transport signal stream.

At block 415, the trick mode controller 224 may receive from the ADS (e.g., 218*a*) or the placement opportunity information service 214, trick mode restriction metadata regarding one or more trick mode settings corresponding to the trick mode to be enforced by a delivery platform (e.g., 206*a*) subsequent to the point in time of the transport signal stream for the specific content. The one or more trick mode settings may comprise information regarding at least one of enabling or disabling the trick mode, the type of trick mode, time point offsets, content duration, or the duration of time that the trick mode is to be enabled or disabled. In an example, the trick mode restriction metadata may comprise a universally unique identifier (UUID) associated with the marker, and one or more uniform resource locators associated with the marker.

At block 420, the trick mode controller 224 may associate the trick mode restriction metadata information with the marker. At block 425, the trick mode controller 224 may store the associated trick mode restriction metadata information in the data store (e.g., the database 226).

At block 430, the trick mode controller 224 may receive from the delivery platform (e.g., 206*a*) an indication that the delivery platform (e.g., 206*a*) has encountered the marker at the point in time of the transport signal stream. In one example, the indication may comprise the marker. At block 435, the trick mode controller 224 may retrieve from the data store (e.g., the database 226), the one or more trick mode settings associated with the marker. At block 440, the trick mode controller 224 may transmit to the delivery platform (e.g., 206*a*), the one or more trick mode settings associated with the marker to be enforced by the delivery platform (e.g., 206*a*).

In an example, the indication may comprise a universal resource locator (URL). In an example, the URL may comprise at least one of a unique identifier indicative of the identified point in time of the content, one or more trick mode control settings, or an endpoint location for the delivery platform to make a network request in order to receive trick mode instructions.

At block 445, the trick mode controller 224 may receive from the delivery platform (e.g., 206*a*) an indication that the delivery platform (e.g., 206*a*) is enforcing the one or more trick mode settings associated with the marker.

The trick mode controller 224 may receive from the delivery platform (e.g., 206*a*) an indication an indication that a consumer used an enabled trick mode or tried to use a disabled trick mode subsequent to the point in time of the transport signal stream.

Figure 5:
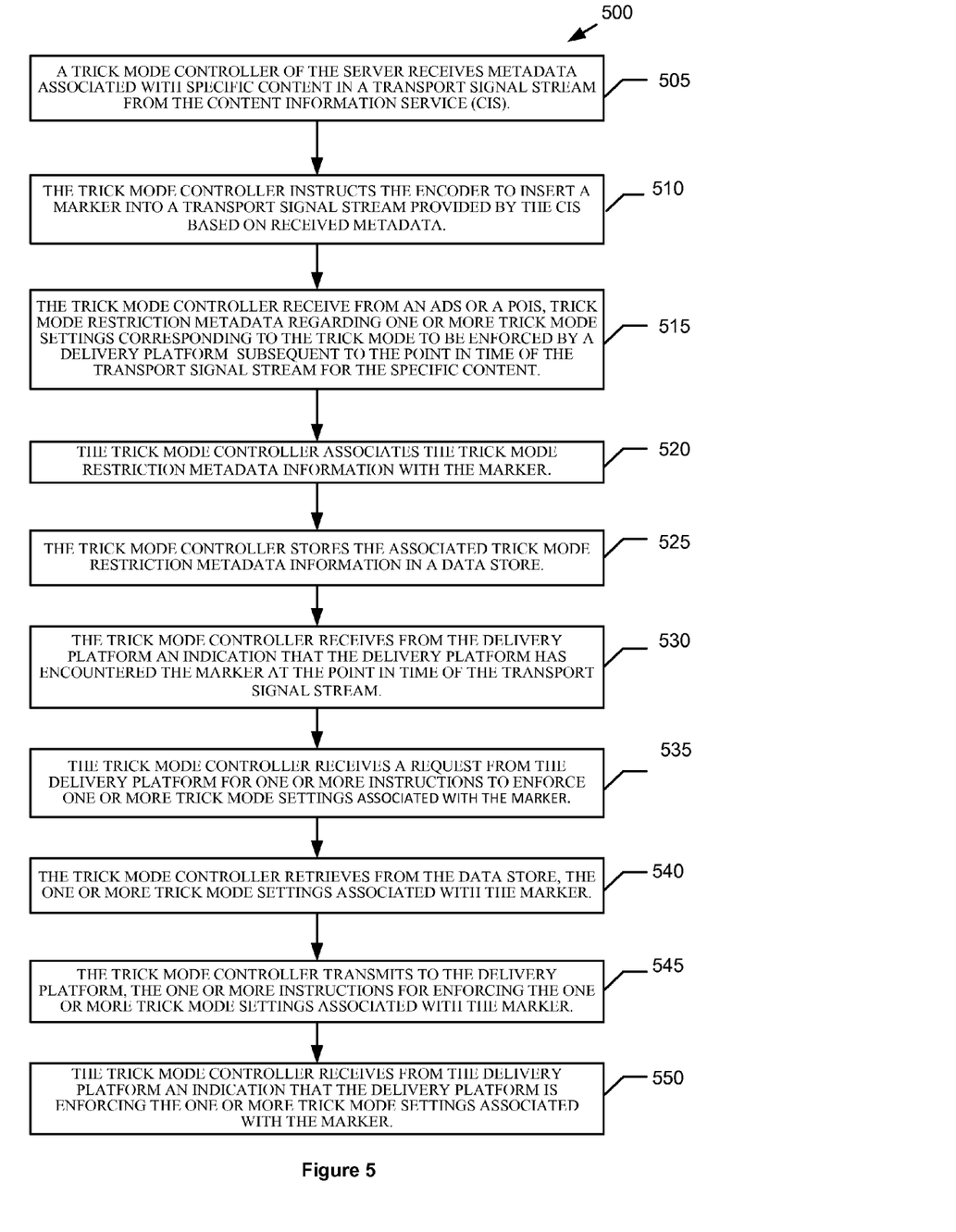
FIG. 5 is a flow diagram illustrating another example of a method for permitting streaming television service providers to enable or disable trick modes in delivery platforms.

FIG. 5 is a flow diagram illustrating another example of a method 500 for permitting streaming television service providers to enable or disable trick modes in delivery platforms (e.g., (e.g., 206*a*-206*n*). The method 500 may be performed by a computer system 500 of FIG. 2 and may comprise hardware (e.g., circuitry, dedicated logic, programmable logic, microcode, etc.), software (e.g., instructions run on a processing device), or a combination thereof. In one example, the method 500 may be performed by the trick mode controller 224 of the server 202 of FIG. 2.

As shown in FIG. 4, at block 505, the trick mode controller 224 of the server 202 may receive metadata associated with specific content in a transport signal stream from the content information service (CIS) 216. At block 510, the trick mode controller 224 may instruct the encoder 210 to insert a marker into a transport signal stream provided by the CIS 216 based on received metadata (e.g., the type of trick mode, the trick mode state (e.g., enabled or disabled), the trick mode duration, the transport signal stream frame rate and resolution, etc.).

The specific content may be ad creative content, entertainment content, or both ad creative content and entertainment content.

The marker may comprise an ID3 tag. The ID3 tag may comprise a unique identifier indicative of the identified point in time of the content and the one or more trick mode settings. The unique identifier may be is a universal unique identifier (UUID). In an example, trick mode controller 224 may insert the ID3 tag into a data track or a fundamental track of the transport signal stream.

At block 515, the trick mode controller 224 may receive from the ADS (e.g., 218a) or the placement opportunity information service 214, trick mode restriction metadata regarding one or more trick mode settings corresponding to the trick mode to be enforced by a delivery platform (e.g., 206a) subsequent to the point in time of the transport signal stream for the specific content. The one or more trick mode settings may comprise information regarding at least one of enabling or disabling the trick mode, the type of trick mode, time point offsets, content duration, or the duration of time that the trick mode is to be enabled or disabled. In an example, the trick mode restriction metadata may comprise a universally unique identifier (UUID) associated with the marker, and one or more uniform resource locators associated with the marker.

At block 520, the trick mode controller 224 may associate the trick mode restriction metadata information with the marker. At block 525, the trick mode controller 224 may store the associated trick mode restriction metadata information in the data store (e.g., the data base 226).

At block 530, the trick mode controller 224 may receive from the delivery platform (e.g., 206a) an indication that the delivery platform (e.g., 206a) has encountered the marker at the point in time of the transport signal stream. In one example, the indication may comprise the marker. At block 535, the trick mode controller 224 may receive a request from the trick mode controller 224 for one or more instructions to enforce one or more trick mode settings associated with the marker.

At block 540, the trick mode controller 224 may retrieve from the data store (e.g., the database 226), the one or more trick mode settings associated with the marker. At block 545, the trick mode controller 224 may transmit to the delivery platform (e.g., 206a), the one or more instructions for enforcing the one or more trick mode settings associated with the marker.

In an example, the indication may comprise a universal resource locator (URL). In an example, the URL may comprise at least one of a unique identifier indicative of the identified point in time of the content, one or more trick mode control settings, or an endpoint location for the delivery platform to make a network request in order to receive trick mode instructions.

At block 550, the trick mode controller 224 may receive from the delivery platform (e.g., 206a) an indication that the delivery platform (e.g., 206a) is enforcing the one or more trick mode settings associated with the marker.

The trick mode controller 224 may receive from the delivery platform (e.g., 206a) an indication an indication that a consumer used an enabled trick mode or tried to use a disabled trick mode subsequent to the point in time of the transport signal stream.

Figure 6:
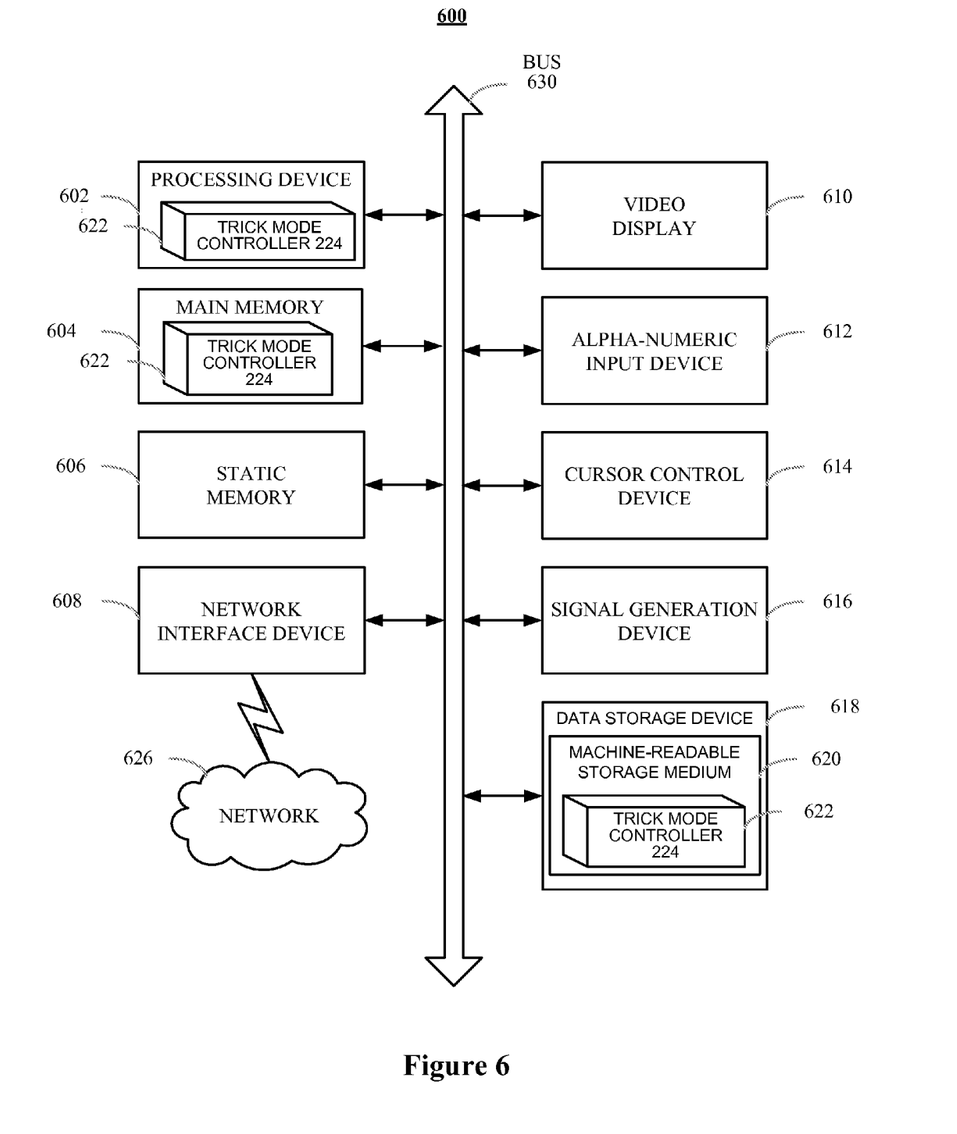
FIG. 6 illustrates a diagrammatic representation of a machine in the exemplary form of a computer system within which a set of instructions, for causing the machine to perform any one or more of the methodologies discussed herein, may be executed.

FIG. 6 illustrates a diagrammatic representation of a machine in the example form of a computer system 600 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The trick mode controller 224 shown in FIG. 2 may be executed by processor 602 configured to perform the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

A drive unit 616 may include a computer-readable medium 624 on which is stored one or more sets of instructions (e.g., instructions of the trick mode controller 224) embodying any one or more of the methodologies or functions described herein. The instructions of the trick mode controller 224 may also reside, completely or at least partially, within the main memory 604 and/or within the processor 602 during execution thereof by the computer system 600, the main memory 604 and the processor 602 also constituting computer-readable media. The instructions of the trick mode controller 224 may further be transmitted or received over a network via the network interface device 622.

While the computer-readable storage medium 624 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method implemented by one or more computing devices, comprising:
    receiving metadata associated with specific content in a transport signal stream from a content information service, the metadata identifying a point in time of the transport signal stream; and
    instructing an encoder to insert a marker into the transport signal stream corresponding to the point in time of the transport signal stream, the marker indicating control of a trick mode to be enforced by a delivery platform subsequent to the point in time of the transport signal stream during play by the delivery platform of the transport signal stream, the transport signal stream having a frame rate and resolution.

2. The method of claim 1, wherein the marker comprises instructions to enforce one or more trick mode settings in the delivery platform.

3. The method of claim 2, wherein the instructions comprise information regarding at least one of enabling or disabling the trick mode, the type of trick mode, time point offsets, content duration, or the duration of time that the trick mode is to be enabled or disabled.

4. The method of claim 1, further comprising:
    receiving, from the delivery platform, an indication that the delivery platform has encountered the marker at the point in time of the transport signal stream.

5. The method of claim 4, wherein the indication comprises the marker.

6. The method of claim 1, wherein the marker is operable to instruct the delivery platform to send a request for one or more instructions to enforce one or more trick mode settings associated with the marker.

7. The method of claim 1, further comprising:
    receiving, from the delivery platform, a request for one or more instructions to enforce one or more trick mode settings associated with the marker.

8. The method of claim 7, further comprising:
    providing, to the delivery platform, the one or more instructions to enforce the one or more trick mode settings associated with the marker.

9. The method of claim 1, further comprising, receiving, from an advertisement decision service or a placement opportunity information service, trick mode restriction metadata regarding one or more trick mode settings corresponding to the trick mode to be enforced by a delivery platform subsequent to the point in time of the transport signal stream for the specific content.

10. The method of claim 9, wherein the one or more trick mode settings comprises information regarding at least one of enabling or disabling the trick mode, the type of trick mode, time point offsets, content duration, or the duration of time that the trick mode is to be enabled or disabled.

11. The method of claim 9, wherein the trick mode restriction metadata comprises a universally unique identifier (UUID) associated with the marker, and one or more uniform resource locators associated with the marker.

12. The method of claim 9, further comprising:
    recording the marker in a data store;
    associating the one or more trick mode settings with the marker; and
    storing the associated one or more trick mode settings in the data store.

13. The method of claim 1, further comprising receiving, from the delivery platform, an indication that the delivery platform has encountered the marker.

14. The method of claim 13, further comprising:
    retrieving, from a data store, one or more trick mode settings associated with the marker.

15. The method of claim 14, further comprising:
    transmitting, to the delivery platform, the one or more trick mode settings associated with the marker.

16. The method of claim 13, wherein the indication comprises a universal resource locator (URL).

17. The method of claim 16, wherein the URL comprises at least one of a unique identifier indicative of the identified point in time of the content, one or more trick mode control settings, or an endpoint location for the delivery platform to make a network request in order to receive trick mode instructions.

18. The method of claim 1, further comprising receiving, from the data platform, an indication that a consumer used an enabled trick mode or tried to use a disabled trick mode subsequent to the point of the transport signal stream.

19. The method of claim 1, wherein the specific content is ad creative content, entertainment content, or both ad creative content and entertainment content.

20. The method of claim 1, wherein the marker comprises an ID3 tag.

21. The method of claim 20, wherein the ID3 tag comprises a unique identifier indicative of the identified point in time of the content and the one or more trick mode settings.

22. The method of claim 21, wherein the unique identifier is a universal unique identifier (UUID).

23. The method of claim 20, further comprising inserting the ID3 tag into a data track or a fundamental track of the transport signal stream.

24. The method of claim 1, further comprising instructing the encoder to insert the marker into one or more specified frames of the transport signal stream on a per frame, per segment, per sub-segment, or per plurality of segments basis.

25. The method of claim 1, further comprising instructing the encoder to insert different markers into corresponding frames in the transport signal stream corresponding to different points in time of the transport signal stream.

26. A method comprising:
receiving metadata associated with specific content in a transport signal stream, the metadata identifying a point in time of the transport signal stream; and
instructing an encoder to insert a marker into the transport signal stream corresponding to the point in time of the transport signal stream, the marker indicating control of a trick mode to be enforced subsequent to the point in time of the transport signal stream during play by the delivery platform of the transport signal stream, the transport signal stream having a frame rate and resolution.

27. The method of claim 26, further comprising:
receiving trick mode restriction metadata regarding one or more trick mode settings corresponding to the trick mode to be enforced subsequent to the point in time of the transport signal stream for the specific content.

28. The method of claim 26, further comprising recording the marker in a data store.

29. A method implemented by one or more computing devices, comprising:
receiving metadata associated with specific content in a transport signal stream, the metadata identifying a point in the transport signal stream; and
instructing an encoder to insert a marker into the transport signal stream corresponding to the point in the transport signal stream, the marker indicating control of a trick mode to be enforced relative to the point in the transport signal stream during play by the delivery platform of the transport signal stream, the transport signal stream having a frame rate and resolution.

30. The method of claim 29, further comprising:
receiving trick mode restriction metadata regarding one or more trick mode settings corresponding to the trick mode to be enforced subsequent to the point in the transport signal stream for the specific content.

* * * * *